UNITED STATES PATENT OFFICE.

HANS KARL AUGUST SIMON von EULER-CHELPIN, OF STOCKHOLM, SWEDEN, ASSIGNOR, BY MESNE ASSIGNMENTS, TO AKTIEBOLAGET ASTRA, APOTEKARNAS KEMISKA FABRIKER, OF STOCKHOLM, SWEDEN.

MANUFACTURE OF CARBOHYDRATE PHOSPHORIC-ACID ESTERS.

1,129,321.     Specification of Letters Patent.     Patented Feb. 23, 1915.

No Drawing.     Application filed May 20, 1913. Serial No. 768,899.

*To all whom it may concern:*

Be it known that I, HANS KARL AUGUST SIMON VON EULER-CHELPIN, a subject of the King of Sweden, residing at Stockholm, in the Kingdom of Sweden, have invented certain new and useful Improvements in the Manufacture of Carbohydrate Phosphoric-Acid Esters, of which the following is a specification.

It is known that dephlegmated beer yeast is able to bind inorganic alkaline phosphates to certain carbohydrates (Iwanoff 1907). Thereby salts of carbohydrate phosphoric acid esters are obtained which according to Harden and Young (*Proc. Roy. Soc.* 81, 528, 1909) are composed according to the formula:

$$C_6H_{10}O_4(PO_4R_2)_2.$$

According to Euler and Foder salts of the formula $$C_3H_7O_3(PO_4R_2)$$

are simultaneously formed.

It has been proved that the synthesis of the carbohydrate phosphoric acid ester is effected by means of a special synthesizing enzym, the phosphatase, which is contained in almost all yeasts, but in very different quantities. If living yeast is brought into the solutions of the said carbohydrate ester salts no fermentation thereof will take place, because said salts cannot penetrate into the yeast cells, and the phosphatase—the enzym which acts to split carbohydrate phosphoric acid esters—does not (or only in very small quantities) leave the living yeast. On the other hand it has been found that living yeast is unsuitable for use in producing carbohydrate phosphoric esters synthetically. In presence of such yeast the sugar disappears by fermentation (formation of alcohol and carbonic acid), and can therefore not be used for synthesis of phosphoric acid esters. It has now been found that most races of *Saccharomyces* can be used in a living undephlegmated propagable condition, to produce the said carbohydrate phosphoric acid ester, or the salts thereof, if the fermenting capacity of the said *Saccharomyces* is weakened or arrested. This preferably is effected by adding protoplasma poisons or antiseptic means, as toluene, thymol, chloroform, phenol, formaldehyde, sodium fluorid or the like. Under these circumstances the effect of the synthesizing enzym, the phosphatase, will either not be weakened at all or only in a small degree. The kind of yeast being most available for the purpose is to be ascertained by tests. Generally there is used so much of the poisons that the speed of fermentation is decreased to $\frac{1}{2}$–$\frac{1}{5}$ of the normal amount. By using dry yeast, yeast juice or the like a simultaneous fermentation of the sugar is prevented in no or in a very small degree by the addition of toluene. The addition of toluene in such event does not have the same advantage as by the present method, because the activity of the present enzyms of fermentation is not lowered. By heating the solution of the carbohydrate phosphoric acid ester to remove the albumins a small part of the ester will easily be decomposed. In order to remove the free phosphoric acid from such solutions there is added to these latter, after the addition of ammonia, a mixture of chlorid of magnesium and sal-ammoniac, to such extent that all the free phosphate be precipitated. The carbohydrate phosphoric acid esters thereby will not be precipitated. The solution thus freed from phosphates is then further treated in the manner indicated below. Also when salts of calcium are produced, the new salt of calcium but not the salt of magnesium-calcium is precipitated. As starting material each kind of sugar which is able to be fermented by yeast, or each material which contains such sugar, may be used. It has been found that starch which by means of malt is transferred into sugar (mash), is especially suitable for the purpose.

*Example—The manufacture of the calcium salt of the carbohydrate phosphoric acid ester.*—To 100 gr. cane sugar dissolved in 250 ccm. water there are added 150 gr. compressed yeast (containing about 30% dry substance) and 10 ccm. toluene. After about ten minutes a solution of 75 gr. di-phosphate of sodium in 300 ccm. water is added. After about four hours all free phosphate is passed away. The yeast is withdrawn by filtration and the solution is heated to about 60° C. Should the solution now contain free phosphates, the same is rendered alkaline by means of ammonia, and so much of a solution of chlorid of magnesium and sal-ammoniac is added, that all free phosphates are precipitated. To the pure filtrate is then added a saturated solution of a salt of calcium in such a quantity that to one part of phosphoric acid there is used one atom of calcium. Further there is added to one part of volume of this mixture about one part of volume of alcohol of 90% degree. The mixture is then left standing for several hours. The calcium salt of the carbohydrate phosphoric acid ester is then withdrawn by filtration and washed with aqueous alcohol. The phosphate is thus quantitively transferred into carbohydrate of phosphoric acid ester. The theoretical yield would amount for 75 gr. di-phosphate of sodium to 44 gr. salt of ester. The losses from the amount of the theoretical yield depend upon the partial solubility of the salt of calcium. From 75 gr. di-phosphate of sodium 38 gr. salt of ester was really obtained.

Having now described my invention, what I claim and desire to protect by Letters Patent is:

1. Method of producing alkaline salts of carbohydrate phosphoric acid esters by means of inorganic phosphates, carbohydrates and living yeast, consisting in adding to the yeast antiseptic means and finally subjecting the mass to the influence of the yeast after its fermenting power has been properly reduced by said addition.

2. Method of producing alkaline salts of carbohydrate phosphoric acid esters by means of inorganic phosphates, carbohydrates and living yeast consisting in adding to the yeast toluene, and finally subjecting the mass to the influence of the yeast after its fermenting power has been properly reduced by said addition.

3. In the process of producing alkaline salts of carbohydrate phosphoric acid esters by means of inorganic phosphates, carbohydrates and living yeast, the steps of purifying the alkaline salts of carbohydrate phosphoric acid esters, which consist in heating the solution of carbohydrate phosphoric acid esters, adding ammonia, a mixture of chlorid of magnesium and sal-ammoniac, and withdrawing the precipitated free phosphate by filtration.

4. Process of manufacturing calcium salt of the carbohydrate phosphoric acid ester consisting in dissolving cane sugar in water and adding compressed yeast and toluene to the mass, leaving the mass settle, and adding diluted di-phosphate of sodium, withdrawing the yeast by filtration, freeing the solution from albumins by heating, adding a saturated solution of a salt of calcium, adding 90% alcohol to the mass and finally withdrawing the calcium salt of the carbohydrate phosphoric acid ester by filtration and washing the same with diluted alcohol.

In testimony whereof I have affixed my signature in presence of two witnesses.

HANS KARL AUGUST SIMON
VON EULER-CHELPIN.

Witnesses:
TH. WAURINSKY,
GRETA PRIEU.